United States Patent [19]

Hall

[11] 3,724,764
[45] Apr. 3, 1973

[54] HYDRAULIC HOE- METHOD AND MEANS

[76] Inventor: Homer Hall, 3910 Emerald Avenue, Apt. 111, Torrance, Calif. 90503

[22] Filed: May 10, 1971

[21] Appl. No.: 141,573

[52] U.S. Cl. .................. 239/587, 134/168, 239/594
[51] Int. Cl. ............................................. B05b 15/08
[58] Field of Search......239/170, 247, 287, 587, 592, 239/594, 597; 134/22, 24, 167, 168

[56] References Cited

UNITED STATES PATENTS

| | | | |
|---|---|---|---|
| 1,534,241 | 4/1925 | Nichols | 239/587 X |
| 2,564,058 | 8/1951 | Fletcher et al. | 239/587 X |
| 3,041,748 | 7/1962 | Wetzel | 239/587 UX |
| 2,919,072 | 12/1959 | Corley, Jr. | 239/587 X |
| 3,601,136 | 8/1971 | Marcham | 239/227 X |

Primary Examiner—M. Henson Wood, Jr.
Assistant Examiner—Michael Mar
Attorney—Charles F. Dischler

[57] ABSTRACT

A portable, manually operated nozzle functions in the manner of a hoe by directing a planar jet stream of water to dislodge residual sludge in a substantially closed container by making a thin elongate impact area of high force concentration thereagainst. A universal joint connects the nozzle outlet with an elongate conduit for directing high pressure flow against the sludge layer.

3 Claims, 5 Drawing Figures

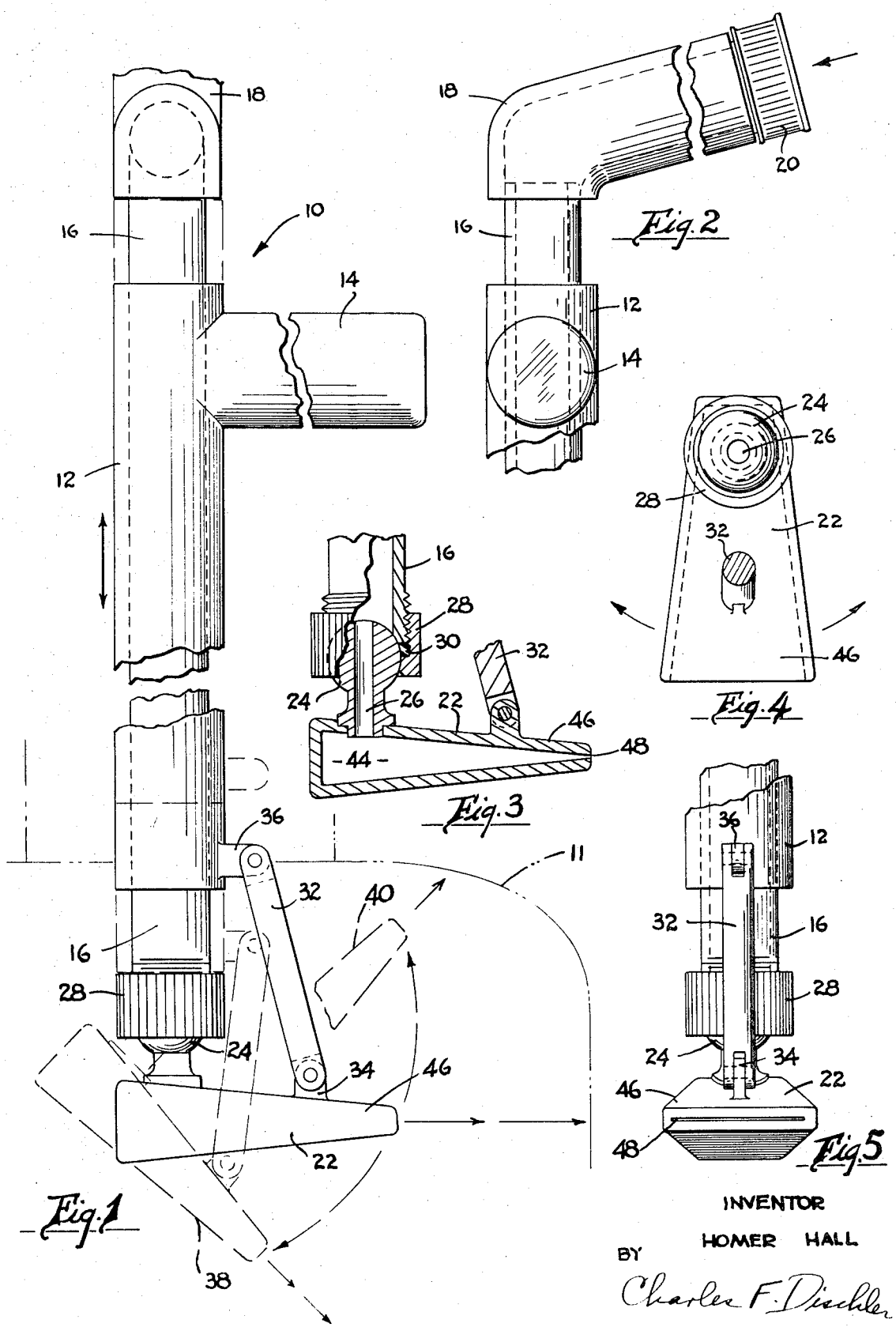

HYDRAULIC HOE- METHOD AND MEANS

BACKGROUND OF THE INVENTION

Many campers and trailers are equipped with sewage collection tanks connected with built-in toilets. These tanks are typically non-uniform in size or shape, such as flat oval cross-section, etc., having a single inlet and one outlet opening. Normally, when the toilet of a camper or trailer is flushed, only a small amount of water is used to accomplish the flushing process, such as one cup or less. This enables the collection tank, which is of limited size such as 35 or 40 gallons capacity, to accommodate a large number of flushings before draining of the tank becomes necessary.

When a camper or trailer is thoroughly cleaned as between cross-country trips and the like, it is normal procedure to connect the external outlet of the sewage collection tank to a line leading to a sewer and to drain the contents of the tank. When draining is complete, the outlet is closed and flushing water is added into the tank through the inlet by any convenient means such as a garden hose until the tank is nearly filled. The outlet is then opened to drain the flushing water into the sewer and this process is repeated until the flushing water drained from the tank is substantially clear.

The foregoing procedure is familiar to most owners of campers or trailers having built-in toilet facilities of the mentioned type. Equally familiar is the fact that complete cleaning of the sewage collection tank cannot be accomplished by merely filling and draining such tank with clean water, because a tenacious layer of sludge accumulates on the inner wall surface of the tank over a period of weeks. This layer cannot be dislodged even by sloshing water around within the tank. After a few months or years of use, as the stated layer of residual sludge becomes increasingly objectionable due to its odor and its diminishing effect on tank capacity, the owner is compelled to have his camper or trailer serviced by factory personnel or other professionals who must remove the tank completely from the vehicle in which it is mounted, in order to steam-clean the inner wall surfaces thereof, all at a substantial cost and inconvenience to such owner.

SUMMARY OF THE INVENTION

This invention contemplates a portable implement 10 attachable to an ordinary garden hose and insertable into the sewage collection tank 11 of a camper or trailer for quickly and completely cleaning such tank. Thus, elongate shaft 12 supports conduit 16 concentrically in sliding telescoping relationship. A nozzle member 22 is pivotally mounted on the lower end of conduit 16 by ball joint 24, while link 32 is pivotally connected at either end thereof to nozzle 22 and shaft 12.

By appropriate manipulation of shaft 12, using handle 14 formed thereon, relative to conduit 16, nozzle 22 is positioned in a generally downward direction to allow the same to pass through the valve housing of a camper toilet (not shown) into tank 11, after which water is supplied to the nozzle by an external hose (not shown) connected to conduit 16 at the upper end thereof. Thereafter, vertical and rotative force is applied to handle 14 causing pivotal and rotational movement of nozzle 22 whereby the high velocity water jet spray escaping from nozzle 22 sharply impacts the surrounding sludge surface in a thin elongate linear impact area in the manner of a hoe. Movement of this impact area over every surface portion of the inner walls of tank 11 progressively cleans the same.

BRIEF DESCRIPTION OF THE DRAWING

FIG. 1 is a front elevational view, partly fragmented, of the inventive device in an illustrative form, FIG. 2 is an isolated fragmented side view of a detail from the structure shown in FIG. 1, FIG. 3 is an isolated cross-sectional view of the nozzle portion of the device shown in FIG. 1, FIG. 4 is a top plan view of the nozzle and associated structure seen in FIG. 1, and FIG. 5 is an isolated elevational view locking directly into the nozzle shown in FIG. 1.

DESCRIPTION OF THE PREFERRED EMBODIMENT

Referring to FIG. 1, the inventive device 10 for cleaning tank 11 comprises elongate hollow support means in the form of shaft 12 having laterally extending handle 14 affixed or otherwise formed thereon. Concentrically slidable within shaft 12 is elongate hollow fluid conduit means in the form of pipe or tube 16 which projects from either end of shaft 12 due to the greater length of the tube compared with the shaft. Tube 16 has fluid inlet connection means at one end thereof as suggested by hose connection fitting 18 with internally threaded female coupling element 20 rotatably mounted on the fitting as seen from FIG. 2. Water from an external source such as a household plumbing system is supplied to tube 16 by connecting an ordinary garden hose (not shown) to fitting 18 by joining a threaded male coupling element on the hose to female coupling element 20. At the lower exit end of tube 16, opposite its connection with the mentioned hose, a nozzle 22 is connected to the tube by universally movable connection means in the form of ball 24 having hollow passage means 26 therethrough to communicate the interior of nozzle 22 with the hollow center of tube 16. Ball 24 is seated in fluid-tight but relatively movable relationship against the exit end of tube 16 and secured in this relationship by retaining collar or bushing 28 firmly engaging the threaded end of the tube as suggested particularly in FIGS. 1 and 3. Flexible sealing means of suitable type such as suggested by rubber O-ring 30 is preferably compressed between the adjacent surface portions of ball 24, tube 16, and bushing 28 as seen in FIG. 3 to prevent leakage of water under pressure from the pivotal connection during operation of the device.

As may be further seen from FIG. 1, cleaning implement 10 is provided with a rigid link 32 extending between two projecting lugs or brackets 34 and 36 formed on nozzle 22 and on shaft 12 near the lower distal end thereof, respectively. Lug 34 is spaced apart from the center longitudinal axis of tube 16 so that force applied in a generally upward or downward direction to the lug causes pivoting movement of nozzle 22 relative to tube 16 as suggested by dashed lines 38 and 40 seen in FIG. 1. The mentioned force is transmitted to lug 34 through link 32 when lug 36 is moved vertically, which occurs when tube 16 is stationary and shaft 12 is manipulated in an upward or downward direction by manual force applied to handle 14. Similarly, when lateral force is applied to handle 14 and tube 16 remains stationary, rotation of nozzle 22 about the center longitudinal axis of tube 16 will occur as suggested by the arrows in FIG. 4, the direction of rotation depending upon the direction of the mentioned lateral force. The foregoing combination of movements will provide a complete range of nozzle positioning as required to direct the nozzle outlet toward substantially all of the inner surfaces of tank 11.

With particular regard to FIGS. 3 and 5, it may be seen that nozzle 22 contains plenum cavity 44 which tapers toward outlet portion 46 and terminates in a narrow elongate slit opening 48. This construction results in a buildup of fluid pressure within cavity 44 as water is admitted thereto through passage 26 in ball 24, after which the built-up pressure, combined with the restriction offered by the small cross-sectional area of exit opening 48, produces a high velocity jet stream of water escaping from the nozzle. Due to the elongate form of exit 48, the stated jet is of thin flat, essentially planar shape and digs into a thick layer of semi-solid sludge in the manner of a thin-edged hoe, although the blade formed by water escaping from opening 48 is entirely liquid. The force resulting from the weight of the water multiplied by its momentum produces an effect on the stationary elongate area impacted by this stream substantially like a rigid metal blade impacting such surface. After initially penetrating a massive layer of sludge, the liquid blade thus formed repeatedly cuts through such layer with a slicing action and also scoops underneath the layer to fragment and separate the same from the inner surfaces of tank 11 rapidly, completely, and progressively while nozzle 22 is moved simultaneously both vertically, angularly, and in circles about a rotation axis coinciding with the long axis of tube 16. The fragmented masses of sludge are thereafter agitated violently by the continued spraying action of nozzle 22, and are forced out of the tank through the usual outlet provided for such tanks and thence into a sewer.

I claim:

1. A manually operable device for removing a layer of sludge from the inner wall surfaces of a substantially closed container, comprising:
   a rigid elongate fluid conduit,
   pivotal joint means connected to one end of said elongate fluid conduit,
   a nozzle connected to said pivotal joint means for relative movement between said nozzle and said fluid conduit throughout a limited range of angular movement,
   said nozzle having a plenum chamber formed therewithin for receiving and accumulating a supply of fluid under pressure,
   said nozzle further having a narrow elongate slit opening forming an outlet for said accumulated fluid in said plenum chamber,
   supply means connected to the other end of said elongate fluid conduit opposite from said one end, for supplying fluid under pressure into said other end, and
   force-transmitting means mounted on said fluid conduit and connected with said nozzle for pivotally moving said nozzle throughout said range of movement relative to said fluid conduit by application of manual force to said force-transmitting means,
   said force-transmitting means including an elongate hollow sleeve concentrically surrounding said elongate fluid conduit in telescoping relationship therewith and both rotationally and slidably movable relative thereto.

2. The structure set forth in claim 1 above, wherein:
   said pivotal joint means comprises a universal joint adapted for angular movement of said nozzle about a horizontal axis when said elongate fluid conduit is in a generally vertical position, and further adapted for rotational movement of said nozzle about a generally vertical axis when said elongate fluid conduit is in said generally vertical position.

3. The structure set forth in claim 2 above, wherein:
   said universal joint consists of a generally spherical ball member seated for rotation within a retaining collar threadably joined to said one end of said elongate fluid conduit.

* * * * *